W. C. MAYER.
CUSHIONING DEVICE FOR VEHICLES.
APPLICATION FILED FEB. 17, 1914.
1,120,511.  Patented Dec. 8, 1914.
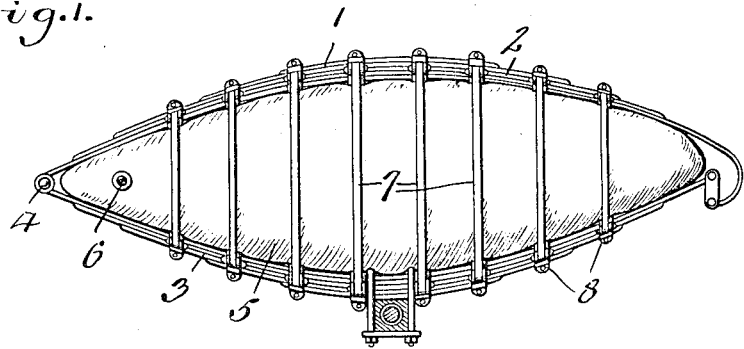
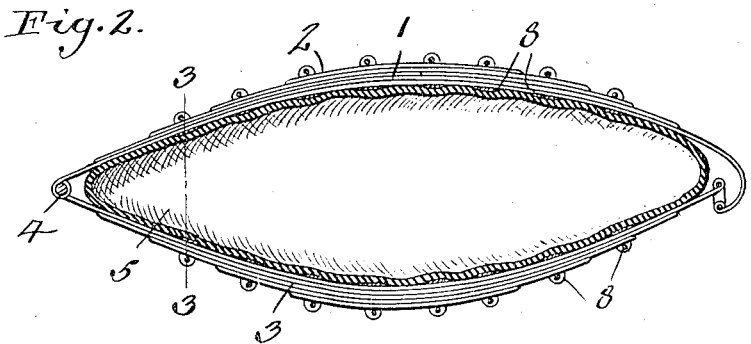
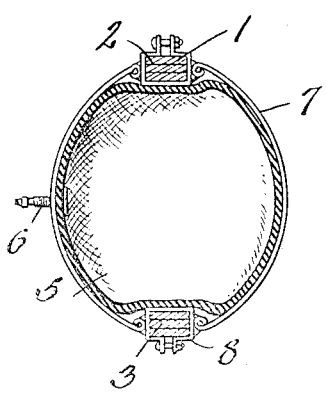
Inventor
W. C. Mayer,
Witnesses
By Victor J. Evans
Attorney

UNITED STATES PATENT OFFICE.

WILLIAM C. MAYER, OF BLACKBURN, MISSOURI.

CUSHIONING DEVICE FOR VEHICLES.

1,120,511.  Specification of Letters Patent.  Patented Dec. 8, 1914.

Application filed February 17, 1914. Serial No. 819,249.

*To all whom it may concern:*

Be it known that I, WILLIAM C. MAYER, a citizen of the United States, residing at Blackburn, in the county of Saline and State of Missouri, have invented new and useful Improvements in Cushioning Devices for Vehicles, of which the following is a specification.

This invention relates to cushioning devices for vehicles designed, in whole or part, to perform the function of the ordinary pneumatic tire, the object of the invention being to provide a cushioning device which may be readily and conveniently applied to the cushioning springs of automobiles and like vehicles, whereby the cushioning action of the springs may be increased and a sufficient cushioning action obtained whereby the use, in whole or part, of pneumatic tires may be dispensed with.

The invention consists of the features of construction, combination and arrangement of parts herein fully described and claimed, reference being had to the accompanying drawing in which:—

Figure 1 is an elevational view of a vehicle spring showing the application of the invention. Fig. 2 is a vertical longitudinal section of the same. Fig. 3 is a vertical transverse section on the line 3—3 of Fig. 2.

Referring to the drawing, 1 designates a bowed or elliptical spring of the type commonly employed upon vehicles of the character described, said spring comprising relatively movable leaves or sections 2 and 3, united to the hinge joints 4. The said leaves 2 and 3 may be secured in any approved or suitable manner to the body and axle of a vehicle.

In carrying my invention into practice, I provide a cushioning device comprising an elastic bag or sack 5, formed of rubber or other suitable material and provided with a check valve inlet 6 whereby it may be filled with compressed air to any desired density or pressure. This bag or sack is of elliptical form to fit between the leaves 2 and 3 of the spring 1 and is designed and adapted to expand and contract or collapse with the spring. For the purpose of securing the bag or sack in position against displacement, while permitting it to have a wide range or amplitude of movement, a series of spring steel retaining strips 7 are provided which are secured to the leaves of the spring by suitable clips or fastenings 8. These spring strips are disposed in parallel relation on opposite sides of the spring and have a bowing action in the collapse of the spring, sufficient to permit free collapse of the bag or sack 5, while preventing the same from shifting out of position.

It is evident from the foregoing description that the invention provides a cushioning device which may be applied to any ordinary elliptical spring of the type shown for use on automobiles and like vehicles, whereby the cushioning action of such device will be added to the usual cushioning action afforded by the spring, so that all shocks and jars will be absorbed or taken up. The increase of this cushioning action afforded by the cushioning devices applied to the several springs of a vehicle may be such as to enable the pneumatic tires ordinarily used to be wholly or partly dispensed with, and solid or plain cushion tires employed in their place, since the shocks and jars taken up by the pneumatic tires will be absorbed by the springs and cushioning devices. The advantages of the invention will accordingly be apparent.

I claim:—

1. In a cushioning device for vehicles, the combination with a vehicle spring composed of relatively movable sections, of a cushioning device disposed between said sections and free from connection therewith, and resilient retaining elements connected with the spring sections and holding said cushioning device from displacement.

2. In a cushioning device for vehicles, the combination with a vehicle spring composed of relatively movable sections, of a cushioning device comprising a pneumatic bag or sack disposed between the spring sections, and resilient spring metal strips disposed on opposite sides of the sack and secured to the sections of the spring to hold said sack from displacement.

3. In a cushioning device for vehicles, the combination with an elliptical vehicle spring composed of relatively movable sections, of a correspondingly shaped pneumatic bag or sack disposed between the leaves of said spring, and spring metal bands or strips on opposite sides of the spring and sack and connected with the leaves of the spring for motion therewith and to hold the sack from displacement.

In testimony whereof I affix my signature in presence of two witnesses.

WILLIAM C. MAYER.

Witnesses:
G. W. KESSLER,
S. P. MORGAN.